United States Patent [19]

Vaughn, Jr.

[11] Patent Number: 5,247,725
[45] Date of Patent: Sep. 28, 1993

[54] FIXTURE INSTALLATION DEVICE

[75] Inventor: Charles G. Vaughn, Jr., Dobbs Ferry, N.Y.

[73] Assignee: Great American Management and Investment, Inc., Chicago, Ill.

[21] Appl. No.: 951,442

[22] Filed: Sep. 25, 1992

[51] Int. Cl.⁵ .............................................. B25J 15/04
[52] U.S. Cl. ....................................... 29/225; 29/268; 29/283
[58] Field of Search ................ 29/225, 230, 268, 283, 29/293.56; 81/53.1, 342; 294/19.1, 97, 118

[56] References Cited

U.S. PATENT DOCUMENTS

| | | | |
|---|---|---|---|
| 407,426 | 7/1889 | Wisdon | 294/19.1 |
| 1,320,777 | 11/1919 | Mayhew | 29/268 |
| 2,643,565 | 6/1953 | Mount | 29/268 |
| 3,310,337 | 3/1967 | Riemenschneider | 294/97 |
| 3,327,376 | 6/1967 | Freeman et al. | 29/225 |
| 4,753,473 | 6/1988 | Arnett | 294/104 |

*Primary Examiner*—Robert C. Watson
*Attorney, Agent, or Firm*—Jones, Day, Reavis & Pogue

[57] ABSTRACT

An attachment device for attaching both compressible spring-type ceiling fixtures and noncompressible ceiling fixtures on an inverted T-shaped ceiling bracket. Opposed gripping surfaces on the outer ends of first and second pivotally attached arms are movable between first and second positions. The gripping surfaces include U-shaped recesses that can hold a noncompressible ceiling fixture for installing it on the ceiling bracket with the use of an elongated rod from a position on the floor. A recess is formed on the outer side of the bottom portion of each of the U-shaped gripping surfaces. An adapter having a base therein with projections on the inside of the adapter base can be mounted on the gripping surfaces with the projections engaging the recesses to retain the adapter on the outer end of the gripping tool. A noncompressible mounting ceiling fixture can be placed therein. Compressible spring-type ceiling fixtures can be placed in the recesses in the opposing gripping surfaces such that when the handles are moved toward each other, the spring fixture is compressed and its prongs opened. It can then be extended to the ceiling with the elongated rod and the pressure on the handles released so that the spring is decompressed to grip a ceiling bracket.

9 Claims, 4 Drawing Sheets

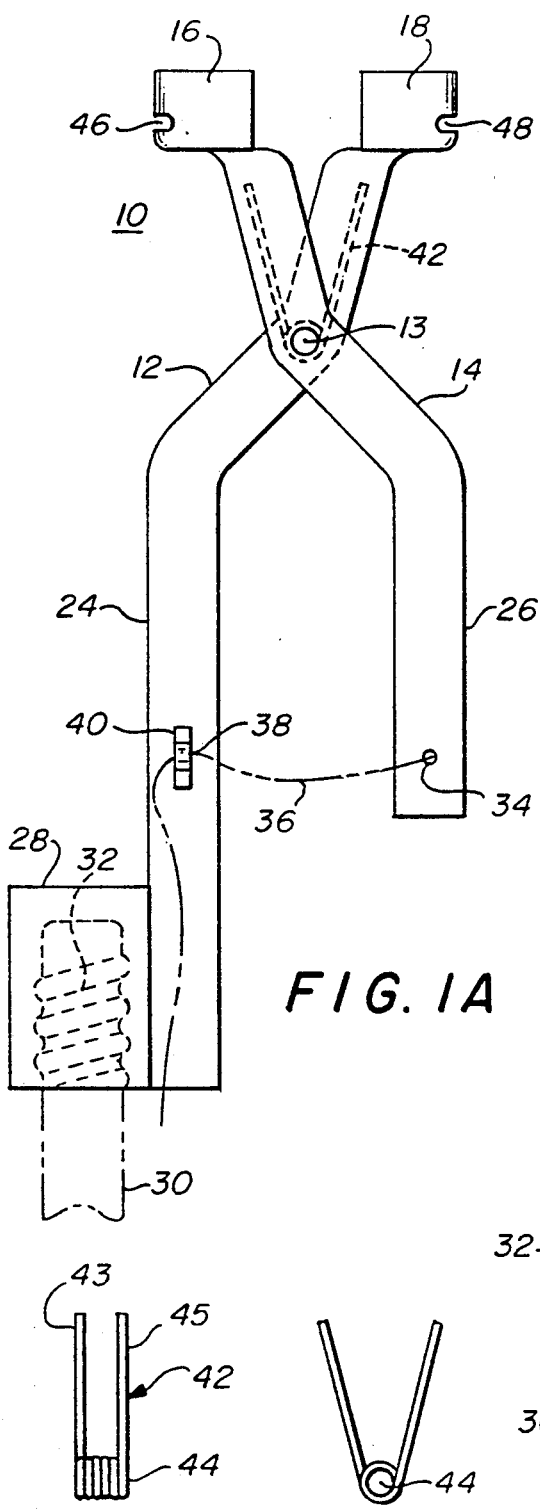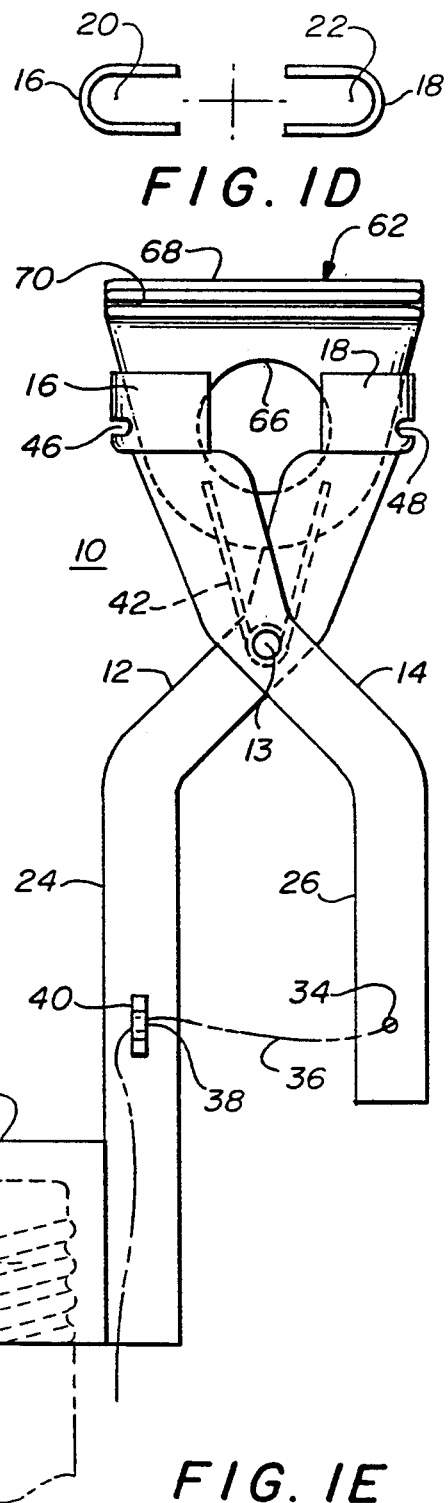
FIG. 1A
FIG. 1B
FIG. 1C
FIG. 1D
FIG. 1E

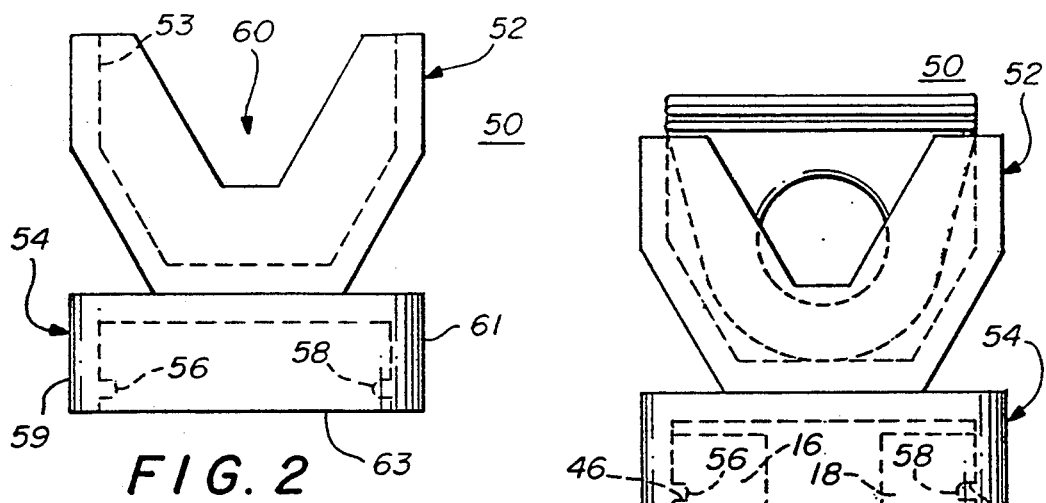
FIG. 2
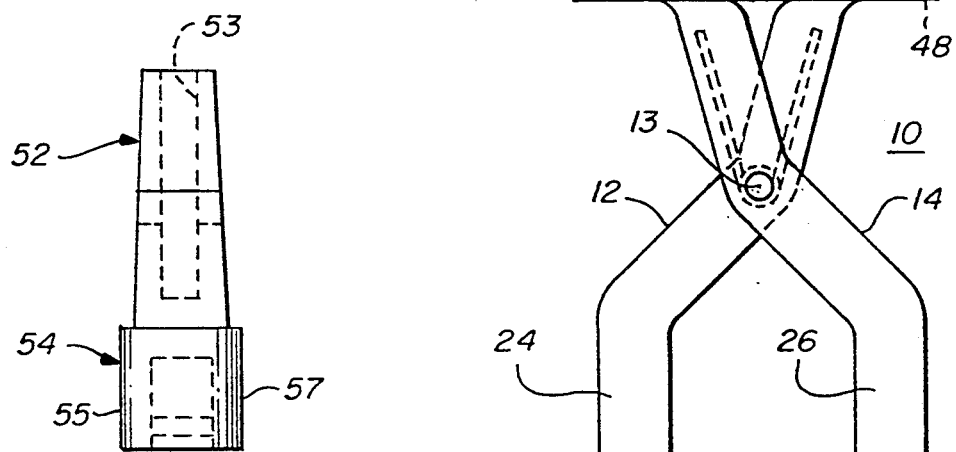
FIG. 3
FIG. 4
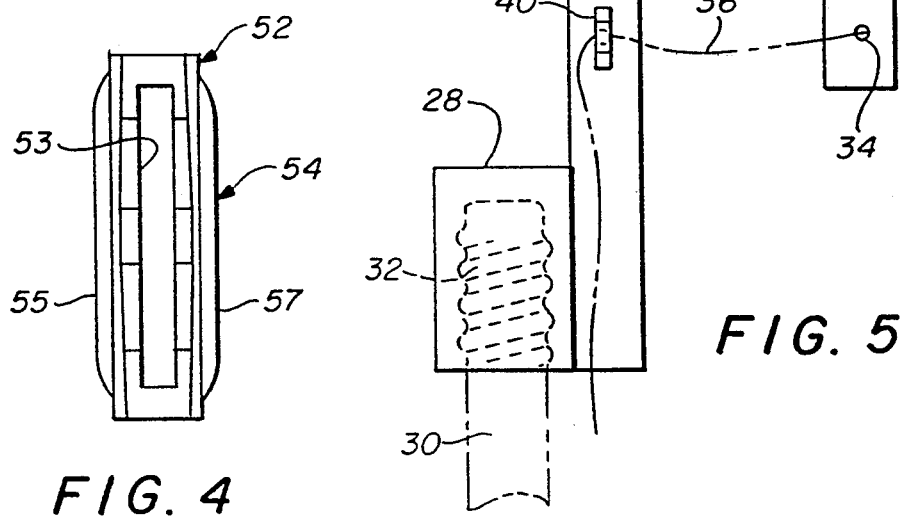
FIG. 5

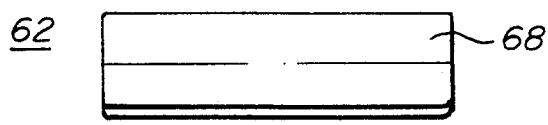
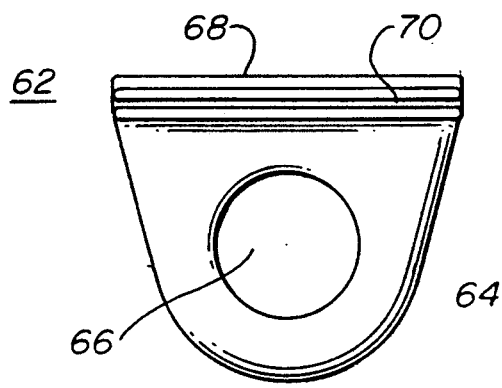
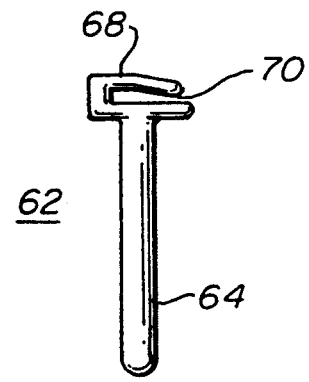
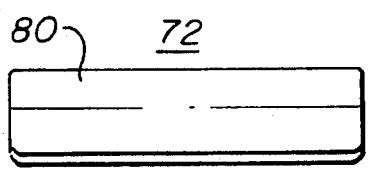
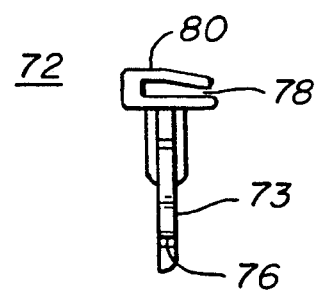
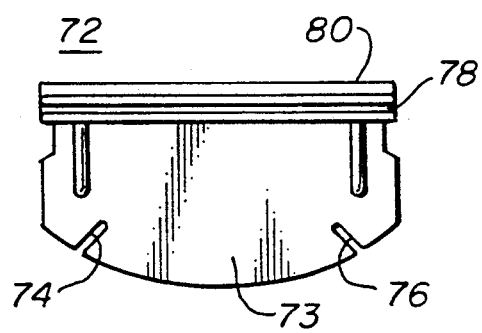

FIXTURE INSTALLATION DEVICE

BACKGROUND OF THE INVENTION

(1) FIELD OF THE INVENTION

The present invention relates in general to a device for installing ceiling fixtures and in particular to a device that installs a first type of ceiling fixture without an adapter and installs a second type of ceiling fixture with an adapter attached thereto.

(2) DESCRIPTION OF RELATED ART

It is well known that in grocery stores and other retail merchandising establishments advertising displays are suspending from the ceiling. Since these fixtures are attached to the ceiling and must be moved often to different locations, ceiling fixtures of various types have been developed which attach to the T-bars that retain ceiling tiles so that a cord can be suspended from the fixture and a lightweight advertising display coupled thereto. In U.S. Pat. No. 4,323,215, a system is disclose which utilizes an adapter attached to the end of a pole or telescoping rod that can reach to the ceiling. Ceiling fixtures are retained by the adapter and are constructed such that with a twisting motion they are able to attach to the T-bars that contain the ceiling tile. A cord is attached to the fixtures and extends downwardly a desired distance above the floor where the display is to be suspended. The ceiling fixtures disclosed in U.S. Pat, No. 4,323,215 have a body portion that can be inserted in the adapter for mounting to the ceiling. However, other types of fixtures exist such as metal and plastic clips that can be squeezed by hand and which have projections that face each other and that are movable toward and away from each other that can be manually attached to the T-bars in the ceiling. Such squeezable fixtures defeat the purpose of the adapter and attached pole that allow the other ceiling fixtures to be installed at great distances above the floor. However, with the squeezable clips, they have to be installed manually. This, of course, requires a tall ladder or other fixture to allow the installer to be able to manually reach the T-shaped bar to install the clip.

SUMMARY OF THE INVENTION

The present invention provides a fixture installation device that overcomes the disadvantages of the prior art by enabling it to install both ceiling fixtures that slidably attach to the T-bars as well as squeezable clip-type fixtures whose contact surfaces can be separated from each other and then released to attach to the T-bar in the ceiling. Therefore, the attachment device can be used for installing both compressible spring-clip ceiling fixtures and noncompressible ceiling fixtures on an inverted T-shaped ceiling bracket. The device has first and second arms pivotally attached to each other. Opposed gripping surfaces are formed by one end of the opposed, first and second arms and are movable between a first at least partially closed position and an open position. Opposing recesses are formed in the opposed gripping surfaces for receiving a ceiling fixture. Opposed handles are formed by the other end of the first and second arms with an elongated rod removably attached to one of the opposed handles to enable the opposed gripping surfaces to be extended to a ceiling with the ceiling fixture. Remotely operated control means is attached to the first and second handles for moving the opposed handles toward each other from a remote distance to enable the spring-clip ceiling fixture to be attached to the ceiling bracket. A biasing spring is associated with the opposed gripping surfaces for forcing the opposed surfaces away from each other to the open position. A generally U-shaped recess is formed in each of the opposed gripping surfaces for receiving a spring-clip-type ceiling fixture such that when the handles are moved toward each other the spring clip is forced open to enable engagement with a T-shaped ceiling bracket and when the gripping surfaces move to the open position, the spring clip grips the bracket and can be released from the generally U-shaped recesses to remain attached to the ceiling. The remote control means for moving the opposed handles toward each other comprises an eyelet-type orifice attached to the outside of the handle to which the elongated rod is attached. The eyelet may be of a type such as on a fishing rod with smooth inner surfaces. An elongated cord is attached to the other opposing handle and passes through the eyelet-type orifice such that, when the cord is pulled or tensioned sufficiently, the biasing spring is overcome and the spring clip is compressed and opened for engagement with the T-shaped ceiling bracket. When the spring clip is raised to the ceiling bracket in the open position with the elongated rod and positioned about the T-shaped bracket, the tension is removed from the cord to enable the biasing spring to return the gripping surfaces to the open position and decompress the spring clip to enable the spring clip to engage the T-shaped ceiling bracket.

The opposing U-shaped recesses in the gripping surfaces can be used to receive a noncompressible ceiling fixture that can be slipped over one edge of the T-shaped ceiling bracket for support. If desired, an adapter may be used with the opposed U-shaped gripping surfaces to receive the noncompressible ceiling fixture. In that case, a recess is formed on the outer side of the bottom portion of each of the U-shaped gripping surfaces. The base of the adapter has projections associated therewith for engaging the recesses on the U-shaped gripping surfaces to hold the adapter on the opposed gripping surfaces. An opening in the top of the adapter receives the noncompressible ceiling fixture such that the adapter may be extended to a ceiling with the use of the elongated rod and attached to the T-shaped ceiling bracket. The adapter base may comprise an enclosed hollow member generally U-shaped in cross section and having side walls and end walls with the open portion of the U-shaped member facing downwardly. One of the projections is integrally formed with and on the inside of each of the end walls such that when the opposed gripping surfaces are moved towards each other, the gripping surfaces can be inserted in the hollow member and when the opposed gripping surfaces are returned to the open position, the projections on each of the end walls engage a corresponding one of the recesses on the opposed gripping surfaces to retain the adapter on the gripping surface. The opening in the adapter includes a raised hollow portion of generally rectangular cross section integrally formed with and extending above the base of the adapter and a rectangular opening in the top of the raised hollow portion having a width and depth sufficient to receive at least a part of a noncompressible ceiling fixture.

Thus, it is a feature of the invention to provide an attachment device for installing both compressible spring-clip ceiling fixtures and noncompressible ceiling fixtures on an inverted T-shaped ceiling bracket.

It is another feature of the present invention to provide an attachment device for installing ceiling fixtures on a ceiling bracket having opposed recesses in opposed gripping surfaces for receiving the ceiling fixture and with an elongated rod removably attached to the opposed gripping surfaces to enable the opposed gripping surfaces to be extended to a ceiling with the ceiling fixture and having a remote control means associated with the opposed gripping surfaces for moving the opposed gripping surfaces toward and away from each other from a remote distance to enable the spring-clip ceiling fixture to be attached to the ceiling bracket.

It is also a feature of the present invention to provide an attachment device having first and second arms pivotally attached to each other and having handles thereon with an eyelet-type orifice attached to the outside of one of the handles and an elongated cord attached to the other opposing handle with the cord passing through the eyelet-type orifice such that, when the cord is tensioned sufficiently, the spring clip is compressed and opened for engagement with the T-shaped ceiling bracket and wherein the spring clip is raised to the ceiling bracket with an elongated rod and the tension removed from the cord to enable the gripping surfaces to return to the open position and decompress the spring clip to engage the ceiling bracket.

It is still another feature of the present invention to provide an adapter for engaging the U-shaped opposed gripping surfaces, the adapter receiving a noncompressible ceiling fixture such that the adapter may be extended to a ceiling with the use of an elongated rod and attached to the T-shaped ceiling bracket.

It is yet another feature of the present invention to provide an adapter for an attachment device that has an enclosed hollow member generally U-shaped in cross section and having side walls and end walls with the open portion of the U facing downwardly and a projection being integrally formed with and on the inside of each of the end walls such that when opposed gripping surfaces on an attachment device are moved towards each other, the gripping surfaces can be inserted in the hollow member and when the opposed gripping surfaces are returned to their open position, the projections on each of the end walls engage a corresponding recess on the opposed gripping surfaces to retain the adapter on the gripping surface.

BRIEF DESCRIPTION OF THE DRAWINGS

These and other objects of the present invention will be more fully understood when taken in conjunction with the attached detailed description of the drawings in which like numerals represent like elements and in which:

FIG. 1A is a diagrammatic front view representation of the gripping tool portion of the fixture installation device;

FIG. 1B is a plan view of a spring-biasing means used in the gripping tool of FIG. 1A;

FIG. 1C is a side view of the biasing spring of FIG. 1B;

FIG. 1D is a top view profile of the gripping elements of the tool of FIG. 1A;

FIG. 1E is a front view of the gripping tool of FIG. 1A with a ceiling fixture mounted therein;

FIG. 2 is a plan view of an adapter to be used with the gripping tool of FIG. 1A;

FIG. 3 is a side view of the adapter of FIG. 2;

FIG. 4 is a top view of the adapter shown in FIG. 2;

FIG. 5 is a front view of the gripping tool of FIG. 1A with the adapter of FIG. 2 containing a ceiling fixture and mounted thereon;

FIG. 6 is a plan view of the first embodiment of a noncompressible slide-on ceiling fixture;

FIG. 7 is a top view of the noncompressible ceiling fixture of FIG. 6;

FIG. 8 is a side view of the noncompressible ceiling fixture of FIG. 6;

FIG. 9 is a plan view of a second embodiment of a noncompressible slide-on ceiling fixture;

FIG. 10 is a top view of the noncompressible ceiling fixture of FIG. 9;

FIG. 11 is a side view of the noncompressible slide-on ceiling fixture of FIG. 9;

DETAILED DESCRIPTION OF THE DRAWINGS

Figure 12:
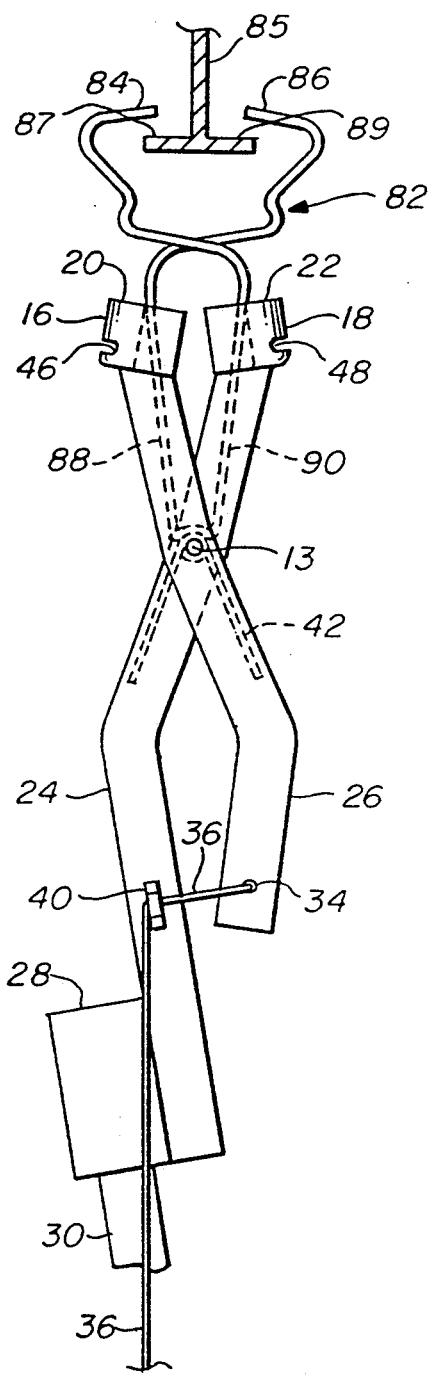
FIG. 12 is a plan view of a gripping tool with a compressible ceiling fixture in the compressed state ready for attachment to a ceiling bracket.
Figure 13:
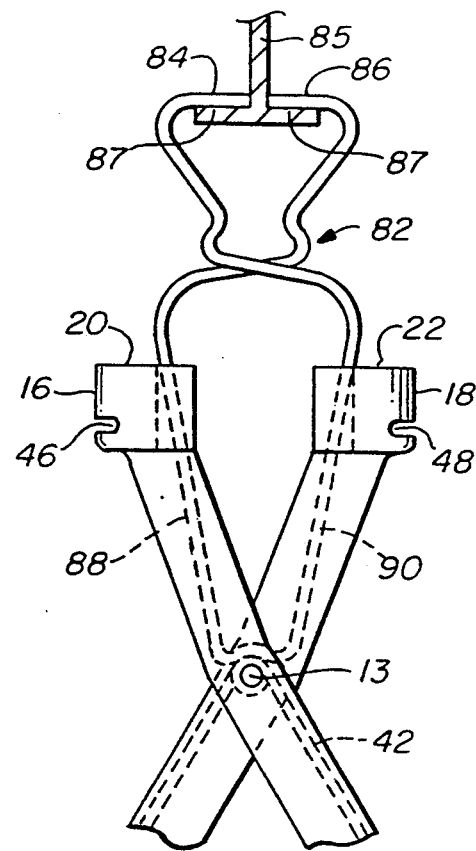
FIG. 13 is a plan view of the gripping tool with the compressible ceiling fixture therein in the noncompressed state.
Figure 14:
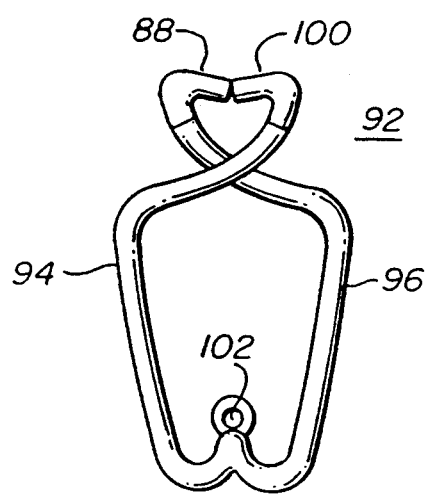
FIG. 14 is a plan view of an alternate embodiment of a compressible ceiling fixture that can be used in the gripping tool of FIG. 13.

FIG. 1A is a plan view of the gripping tool 10 that forms a portion of the attachment device for installing both compressible spring-clip ceiling fixtures and noncompressible ceiling fixtures on a ceiling bracket. The gripping tool 10 comprises first and second arms 12 and 14 pivotally attached to each other at pivot point 13. Opposed gripping surfaces 16 and 18 are formed on one end of the opposed first and second arms 12 and 14 and are movable between a first at least partially closed position and an open position as shown. Inwardly opposed recesses 20 and 22 are formed in the opposing gripping surfaces 16 and 18 for receiving a ceiling fixture. The recesses 20 and 22 are generally U-shaped (FIG. 1D) for receiving a spring-clip-type ceiling fixture such that when the handles 24 and 26 are moved toward each other, the spring clip prongs are forced open to enable engagement with a ceiling bracket as will be explained hereafter in relation to FIG. 12. When the gripping surfaces 16 and 18 move to the open position as shown, the spring-clip prongs grip the ceiling bracket as will be illustrated in FIG. 13 hereafter. Opposed handles 24 and 26 are formed by the other end of the first and second pivotally attached arms 12 and 14. Bracket 28 attached to handle 24 allows an elongated rod 30 to be removably attached thereto by means of threads 32 to enable the opposed gripping surfaces 16 and 18 to be extended to a ceiling with a ceiling fixture for installation. A cord 36 is attached at orifice 34 to handle 26 and passes through an eye 38 of a bracket 40 on handle 24 for moving the opposed handles 24 and 26 toward each other from a remote distance to enable spring-clip ceiling fixtures to be attached to a ceiling bracket. A biasing means 42, such as a resilient spring, is associated with the opposed gripping surfaces 16 and 18 for forcing the opposed gripping surfaces 16 and 18 away from each other to the open position as illustrated. The biasing spring is illustrated in FIG. 1B in a plan view and in FIG. 1C as a side view. It has an orifice 44 formed by the wound spring through which the pivot pin 13 is inserted in the gripping device 10 to allow the spring arms 43 and 45 to rest against opposing arms 12 and 14 to bias the opposed gripping surfaces 16 and 18 away from each other to the open position as illustrated in FIG. 1A. The gripping tool in FIG. 1A can be used to install the spring-type ceiling fixtures as shown in FIGS. 12, 13 and 14 and as will be explained hereafter. The opposing recesses 20 and 22 in the gripping surfaces 16 and 18 are generally U-shaped as shown in FIG. 1D and can receive a noncompressible ceiling fixture as illustrated in FIGS. 6 and 9. In such case, the elongated handle 30 is used to raise the noncompressible ceiling fixture seated in opposed recesses 20 and 22 to the ceiling for attachment to a ceiling bracket. Recesses 46 and 48 are used to hold a ceiling fixture adapter 50 as shown hereafter.

The preferred apparatus for installing noncompressible ceiling fixtures is the use of adapter 50 illustrated in FIG. 2. Adapter 50 has an upper portion 52 with an opening 53 therein and a cut-away portion 60 formed therein. It is integrally molded with a base 54 that has projections 56 and 58 therein for engaging the recesses 46 and 48 on the U-shaped gripping surfaces 16 and 18 of the gripping tool 10 shown in FIG. 1A to hold the adapter 50 on the opposed gripping surfaces 16 and 18. The generally rectangular shaped opening 53 in the top 52 of the adapter 50 receives a noncompressible ceiling fixture such that the adapter 50 may be extended to a ceiling with the use of the elongated rod 30 and attached to a ceiling bracket, such as a T-shaped bracket, that holds the ceiling tiles in place. The adapter base 54 is an enclosed hollow member generally U-shaped in cross section as can be seen in FIG. 3 and having side walls 55 and 57 as illustrated in FIG. 3. It also has end walls 59 and 61 as illustrated in FIG. 2. The bottom 63 of the U-shaped portion 54 is open with the open portion of the U facing downwardly. One of the projections 56 is integrally formed with and on the inside of end wall 59 on base 54 while the other projection 58 is integrally formed with and on the inside of end wall 61 of base 54. FIG. 3 is a side view of the adapter and FIG. 4 is a top view of the adapter.

FIG. 5 illustrates the adapter 50 mounted on the gripping tool 10. It can be seen in FIG. 5 that when the opposed gripping surfaces 16 and 18 are moved towards each other, they can be inserted in the hollow base member 54 as shown in FIG. 5 and when the opposed gripping surfaces 16 and 18 are returned to the open position illustrated in FIG. 1A, the projections 56 and 58 on each of the end walls 59 and 61 of the base portion 54 engage a corresponding one of the recesses 46 and 48 on the opposed gripping surfaces 16 and 18 to grip adapter 50 and retain it on the gripping tool 10 as illustrated in FIG. 5. The raised hollow portion 52 of adapter 50 is generally rectangular in cross section as can be seen in FIG. 4 and is integrally formed with and extending above the base 54 of the adapter 50. The rectangular opening 53 in the top of the raised hollow portion 52 has a width and depth sufficient for receiving at least a portion of a noncompressible ceiling fixture illustrated in FIGS. 6 and 9. The noncompressed ceiling fixtures of FIGS. 6 and 9 are inserted in the opening 53 in the top portion 52 of the adapter 50 and can then be lifted to the ceiling with the elongated rod 30 for attachment of the noncompressible ceiling fixture to the ceiling bracket.

FIG. 6 is a plan view of one embodiment of a noncompressible slide-on ceiling fixture. The ceiling fixture 62 has a body portion 64 with an orifice 66 therein. The top portion 68 has a horizontal slot 70 formed therein so that the ceiling fixture can be slipped on one edge of the ceiling bracket which are generally in the form of inverted T-shaped brackets. The fixture 62 can engage one of the horizontal portions of the inverted T-shaped bracket in slot 70 so that the fixture 62 is retained on the ceiling. Of course, a cord can be attached to the orifice 66 and extended toward the floor for attaching advertisements thereto.

FIG. 7 is a top view of the noncompressible slide-on ceiling fixture in FIG. 6, while FIG. 8 is a side view more clearly illustrating the slot 70. The body portion 64 illustrated in FIG. 8 is slipped into the rectangular opening 53 in the top of the raised hollow portion 52 of the adapter 50 and is retained therein during the installation of the ceiling fixture. When it is installed on the ceiling bracket, the elongated arm and gripping tool are lowered, thus lowering the adapter 50 with it and it simply slides off the noncompressible slide-on ceiling fixture 62 and leaves it attached to the ceiling.

In like manner, a second embodiment of a noncompressible slide-on ceiling fixture 72 is illustrated in FIG. 9. It has slots 74 and 76 formed in the body portion 73 thereof enabling a cord to be wound thereon. It also has a top portion 80 that has a slot 78 therein that again can be received on a horizontal portion of a ceiling fixture such as an inverted T-shaped bracket.

FIG. 10 is a top view of the noncompressible slide-on ceiling fixture 72 of FIG. 9 while FIG. 11 is a side view. FIG. 11 clearly illustrates the slot 78 in the top portion 80 that can be attached to the inverted T-shaped ceiling fixture on the horizontal portion thereof. It also illustrates body portion 73 that can be inserted in the opening 53 of the adapter 50 in a manner similar to that described earlier with respect to FIG. 6.

As shown in FIG. 1E, a ceiling fixture 62 can be inserted in the U-shaped recesses 20 and 22 of gripping surfaces 16 and 18 without the use of the adapter 50. However, the fit is not as precise as with the adapter 50 and thus the use of the adapter 50 is preferred.

Thus, a noncompressible ceiling fixture can be installed with the gripping tool 10 by itself by having the noncompressible fixture placed in the U-shaped recesses 20 and 22 of the gripping tool 10 or the adapter 50 can be placed on the gripping surfaces 16 and 18 of the gripping tool 10 as illustrated in FIG. 5 and, in either case, can be raised to the ceiling for attachment to the ceiling bracket.

The tool 10 can also be used to attach compressible ceiling fixtures to a ceiling bracket. As can be seen in FIG. 12, a compressible ceiling fixture in the form of a metal spring clip 82 having arms 88 and 90 with prongs 84 and 86 on the outer end thereof. The arms 88 and 90 are inserted in the outer ends of the gripping surfaces 16 and 18 in the U-shaped recesses 20 and 22 as shown. When the gripping tool handles 26 and 24 are moved toward each other, the arms 88 and 90 of the spring clip 82 are compressed and the prongs 84 and 86 separate from each other, thus enabling them to make engagement with the ceiling bracket 85 by slipping over the horizontal portions 87 and 89 of the inverted T-shaped bracket and, when the handles 24 and 26 are released, the spring-biasing means 42 returns the gripping surfaces 16 and 18 to their normal position as illustrated in FIG. 13 and the prongs 84 and 86 of the spring clip 82 engage the ceiling bracket 85 a shown and is thus attached thereto. To install a resilient spring bracket such as bracket 82, the spring clip is inserted in the U-shaped portions 20 and 22 of the gripping surfaces 16 and 18.

The cord 36 is tensioned or pulled sufficiently so that the biasing spring 42 is overcome and the spring clip is compressed as shown in FIG. 12 ready for engagement with the ceiling bracket. The tension on the cord is maintained while the elongated rod 30 is used to raise the spring clip 82 to the ceiling bracket 85. When the open spring 82 has its prongs 84 and 86 around the ceiling bracket as shown in FIG. 12, the tension is removed from the cord 36 and the biasing spring 42 returns the gripping surfaces 16 and 18 to their open position as shown in FIG. 13 and the spring clip 82 is decompressed and its prongs 84 and 86 engage the ceiling bracket. In the alternative, the spring clip 82 can be inserted in the gripping surfaces 16 and 18 and raised to the ceiling. The cord 36 can then be tensioned to compress the clip 82 to open prongs 84 and 86. After attachment to the ceiling bracket, the cord can be released and the spring 42 opens the gripping surfaces 16 and 18 to release the clip 82.

FIG. 14 is a plan view of an alternate embodiment of a compressible ceiling fixture that is made of plastic instead of steel as spring clip 82. The plastic clip 92 has arms 94 and 96 on the end of which are prongs 98 and 100. The clip functions in a manner identical to that of the spring clip. An orifice 102 is formed in the base thereof for attachment of a cord so that the cord can support an advertising display or sign at a proper level customers.

Thus, there has been disclosed a novel attachment device for installing both compressible spring-clip ceiling fixtures and noncompressible ceiling fixtures on a ceiling bracket. Opposed gripping surfaces are formed on one end of opposed first and second arms and are movable between a first closed position and an open position. Opposing recesses in the opposed gripping surfaces receive a ceiling fixture. Opposed handles formed on the other end of the first and second arms are used to force the opposed gripping surfaces toward and away from each other. An elongated rod is removably attached to one of the opposed handles to enable the opposed gripping surfaces to be extended to a ceiling with a ceiling fixture attached thereto. A remote control means such as a cord attached to one handle and passing through the eye of a fixture on the other handle enables the opposed handles to be moved towards each other from a remote distance to enable spring-clip ceiling fixtures to be attached to the ceiling bracket. A spring-biasing means associated with the opposed gripping surfaces returns the handles of the gripping surfaces to their normally open position when tension is removed from the cord. The gripping surfaces 16 and 18 include generally U-shaped recesses therein for receiving a spring-clip-type ceiling fixture such that, when the handles are moved toward each other, the spring clip is forced open to enable its prongs to separate and engage a ceiling bracket and, when the gripping surfaces are moved to the open position, the spring clip decompresses and grips the ceiling bracket.

In another embodiment as disclosed hereinabove with particular reference to FIGS. 2-5 the generally U-shaped opposed gripping surfaces have a recess on the outer side of the bottom portion thereof. An adapter has an enclosed hollow base member thereon that is generally U-shaped in cross section and has side walls and end walls so that the open portion of the U faces downwardly. Projections are integrally formed with and on the inside of each of the end walls such that when the opposed gripping surfaces on the gripping tool are moved toward each other, the gripping surfaces can be inserted in the hollow member and when the opposed gripping surfaces are returned to the open position, the projections on each of the end walls engage a corresponding one of the recesses on the opposed gripping surfaces to retain the adapter on the gripping surface. The adapter has a raised hollow portion of generally rectangular cross section integrally formed with and extending above the base of the adapter. A rectangular opening in the top of the raised hollow portion has a width and depth sufficient to receive at least a part of a noncompressible ceiling fixture. Thus, when the elongated rod extends the noncompressible ceiling fixture to the ceiling it can be slipped on a ceiling bracket for attachment thereto.

The foregoing specification describes only the embodiments of the invention shown and/or described. Other embodiments may be articulated as well. The terms and expressions used, therefore, serve only to describe the invention by example and not to limit the invention. It is expected that others will perceive differences which, while different from the foregoing, do not depart from the scope of the invention herein described and claimed. In particular, any of the specific constructional elements described may be replaced by any other known element having equivalent function.

I claim:

1. An attachment device for installing both compressible spring-clip ceiling fixtures and noncompressible ceiling fixtures on an inverted T-shaped ceiling bracket comprising:

first and second arms pivotally attached to each other;

opposed gripping surfaces formed on one end of the opposed first and second arms and movable between a first closed position and an open position;

inwardly opposed recesses in the opposed gripping surfaces for receiving a ceiling fixture;

opposed handles formed on the other end of the first and second arms;

an elongated rod removably attached to one of the opposed handles to enable the opposed gripping surfaces to be extended to a ceiling with a ceiling fixture attached thereto; and remote control means attached to the first and second handles for moving the opposed handles toward each other from a remote distance to enable spring-clip ceiling fixtures to be attached to the ceiling brackets.

2. An attachment device as in claim 1 further including biasing means associated with the opposed gripping surfaces for forcing the opposed gripping surfaces away from each other toward the open position.

3. An attachment device as in claim 2 further comprising a generally U-shaped recess in each of the opposed gripping surfaces for receiving a spring-clip-type ceiling fixture having opposing prongs such that when the handles are moved toward each other the spring-clip prongs are forced open to enable engagement with a ceiling bracket and when the gripping surface is moved to the open position the spring-clip prongs are closed to grip the bracket.

4. An attachment device as in claim 3 wherein the remote control means for moving the opposed handles toward each other further comprises:

an eyelet-type orifice attached to the outside of the handle to which the elongated rod is attached; and an elongated cord attached to the opposing handle, the cord passing through the eyelet-type orifice such that when the cord is tensioned sufficiently the biasing means is overcome, the spring clip is compressed and the prongs opened for engagement with the ceiling bracket such that when the spring clip is raised to the ceiling bracket with the elongated rod and the tension removed from the cord, the biasing means returns the gripping surfaces to the open position to decompress the spring clip and allow the prongs to engage the ceiling bracket.

5. An attachment device as in claim 4 wherein the biasing means is a resilient spring attached to the pivot point of the opposing arms and engaging each arm so as to bias the opposed gripping surfaces to the open position.

6. An attachment device as in claim 1 wherein the opposing recesses in the opposed gripping surfaces are generally U-shaped for receiving a noncompressible ceiling fixture that can be raised to the ceiling for engagement with the ceiling bracket.

7. An attachment device as in claim 1 further comprising:
 a recess on the outer side of the bottom portion of each of the opposed gripping surfaces;
 an adapter having a base thereon;
 projections on the adapter base for engaging the recesses on the opposed gripping surfaces to hold the adapter on the opposed gripping surfaces; and
 receiving means in the top of the adapter for receiving a noncompressible ceiling fixture such that the adapter may be extended to a ceiling with the use of the elongated rod and attached to the T-shaped ceiling bracket.

8. An attachment device as in claim 7 wherein the adapter base comprises:
 an enclosed hollow member generally U-shaped in cross section and having side walls and end walls with the open portion of the U facing downwardly; and
 one of the projections being integrally formed with and on the inside of each of the end walls such that when the opposing gripping surfaces are moved toward each other, the gripping surfaces can be inserted in the hollow member and when the opposed gripping surfaces are returned to the open position, the projections on each of the end walls engage a corresponding one of the recesses on the opposed gripping surfaces to retain the adapter on the gripping surface.

9. An attachment as in claim 8 wherein the receiving means in the adapter comprises:
 a raised hollow portion of generally rectangular cross section integrally formed with and extending above the base of the adapter; and
 a rectangular opening in the top of the raised hollow portion having a width and depth sufficient to receive at least a part of a noncompressible ceiling fixture.

* * * * *